United States Patent
Garakani

[19]

[11] Patent Number: 5,583,954
[45] Date of Patent: Dec. 10, 1996

[54] METHODS AND APPARATUS FOR FAST CORRELATION

[75] Inventor: Armon M. Garakani, Cambridge, Mass.

[73] Assignee: Cognex Corporation, Natick, Mass.

[21] Appl. No.: 203,812

[22] Filed: Mar. 1, 1994

[51] Int. Cl.$^6$ ........................................... G06K 9/64
[52] U.S. Cl. ...................... 382/278; 364/728.01
[58] Field of Search .............................. 395/94; 364/753, 364/754, 736, 726, 728.01; 382/30, 42, 48, 209, 278, 217

[56] References Cited

U.S. PATENT DOCUMENTS

| | | |
|---|---|---|
| 3,816,722 | 6/1974 | Sakoe et al. . |
| 3,967,100 | 7/1976 | Shimomura . |
| 3,978,326 | 8/1976 | Shimomura . |
| 4,200,861 | 4/1980 | Hubach et al. . |
| 4,300,164 | 11/1981 | Sacks . |
| 4,385,322 | 5/1983 | Hubach et al. . |
| 4,581,762 | 4/1986 | Lapidus et al. . |
| 4,606,065 | 8/1986 | Beg et al. . |
| 4,742,551 | 5/1988 | Deering . |
| 4,860,375 | 8/1989 | McCubbrey et al. . |
| 4,972,359 | 11/1990 | Silver et al. . |
| 5,046,190 | 9/1991 | Daniel et al. . |
| 5,189,712 | 2/1993 | Kajiwara et al. ............... 382/42 |
| 5,253,308 | 10/1993 | Johnson . |
| 5,337,267 | 8/1994 | Colavin .......................... 364/753 |

OTHER PUBLICATIONS

Dave Bursky, "CMOS four-chip set processes images at 20-MHz data rates, Electronic Design", May 28, 1987, pp. 39–44.

Plessey Semiconductors, Preliminary Information, May 1986, Publication No. PS2067, May 1986, pp. 1–5.

NEC Electronics Inc., μPD7281 Image Pipelined Processor, Product Information Brochure, pp. 2–169–2–211.

*Primary Examiner*—Joseph Mancuso
*Attorney, Agent, or Firm*—Russ Weinzimmer

[57] ABSTRACT

An image processing system generates a correlation of a model signal and the image signal using an array of algebraic squares of pixel values and sums thereof stored in cache memory. A CPU, coupled to the cache memory, addresses the cache memory array in accord with image pixel values to generate a $\Sigma\Sigma I^2$ signal comprising the sum of squares of those values. The CPU also addresses the cache memory array in accord with the sums of corresponding image and model pixel values to generate a $\Sigma\Sigma(I+M)^2$ signal. A correlation element generates a score signal as a function of the mathematical expression $\Sigma\Sigma(Iij+Mij)^2 - \Sigma\Sigma Iij^2 - \Sigma\Sigma Mij^2$.

11 Claims, 2 Drawing Sheets

METHODS AND APPARATUS FOR FAST CORRELATION

REFERENCE TO APPENDICES

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright whatsoever.

BACKGROUND OF THE INVENTION

This invention relates to data processing generally, and, particularly, to methods and apparatus for rapidly determining correlations, e.g., of images in a machine vision system.

Machine vision systems provide automatic inspection of objects to locate patterns for alignment, to measure distances, angles and other critical dimensions, to inspect the quality of manufactured items, and to identify unknown objects. The systems, which combine digital image processing hardware and software, must perform rapidly and without extensive hardware resources a variety of computations, such as convolution and correlation.

The latter function, correlation, is typically used in locating and judging the quality of image features by comparing them with known models. The result is a correlation, or "shape," score which is a measure of how closely the compared features match.

On machine vision systems, and other digital data processing apparatus, correlations are generally determined in accord with a correlation formula such as $$\frac{N\Sigma\Sigma_{ij} I_{i,j} M_{i,j} - \left(\Sigma\Sigma_{ij} I_{i,j}\right)\left(\Sigma\Sigma_{ij} M_{i,j}\right)}{\sqrt{\left[N\Sigma\Sigma_{ij} I_{i,j}^2 - \left(\Sigma\Sigma_{ij} I_{i,j}\right)^2\right]\left[N\Sigma\Sigma_{ij} M_{i,j}^2 - \left(\Sigma\Sigma_{ij} M_{i,j}\right)^2\right]}}$$

where,

N is the total number of pixels, $I_{ij}$ is the image pixel at location (i,j)

$M_{ij}$ is the model pixel at location (i,j)

Typically, the overall correlation is determined by generating the value of the individual components set forth in the above formula. Thus, to determine the correlation, a conventional vision system would generate values for the sum of the products of corresponding image and model pixels, $\Sigma\Sigma I_{ij} \times M_{ij}$, as well as for the sum of the squares of the image pixel values, $\Sigma\Sigma I^2_{ij}$, the sum of the squares of the model pixel values, $\Sigma\Sigma M^2_{ij}$, etc., before performing the requisite square root and division.

A problem with such a conventional technique is that it consumes undue resources and takes unnecessarily long.

There accordingly is a need for improved methods and apparatus for generating correlations and normalized correlations. More particularly, there is a need for improved such methods and apparatus as can determine more quickly and inexpensively. It is an object of this invention to provide a system meeting these and other such needs.

SUMMARY OF THE INVENTION

The invention provides an image processing system responsive to a model signal, M, comprising model pixel values and an image signal, I, comprising image pixel values, for generating a score signal representative of a degree of correlation between the model signal and the image signal. The system includes a cache memory for storing a table of algebraic squares of pixel values and sums thereof. The cache memory is responsive to address signals based on such values (or sums) for accessing and generating a signal representative of the corresponding algebraic square.

The system further includes a central processing unit (CPU), coupled to the cache memory, for processing the model signal and the image signal to generate a score signal. Thus, the CPU includes an image square element for addressing the cache memory in accord with image pixel values to generate a $\Sigma\Sigma I^2$ signal comprising the sum of squares of those values. The CPU also includes a sum square element for addressing the cache memory in accord with the sums of corresponding image and model pixel values to generate a $\Sigma\Sigma(I+M)^2$ signal. Likewise, the CPU can includes a model square element for addressing the cache memory in accord with model pixel values to generate a $\Sigma\Sigma M^2$, although that signal can be pre-computed, e.g., as a result of prior operations, such as "training," by the visions system.

A correlation element responds to the $\Sigma\Sigma M^2$ signal, the $\Sigma\Sigma I^2$ signal and the $\Sigma\Sigma(I+M)^2$ signal to generate a score signal as a function of the mathematical expression $$\Sigma\Sigma(I_{ij}+M_{ij})^2 - \Sigma\Sigma I_{ij}^2 - \Sigma\Sigma M_{ij}^2.$$

More particularly, the correlation elements generates the score signal in accord with the expression $$\frac{N\frac{\Sigma\Sigma(I_{ij}+M_{ij})^2 - \Sigma\Sigma I_{ij}^2 - \Sigma\Sigma M_{ij}^2}{2} - \left(\Sigma\Sigma_{ij} I_{i,j}\right)\left(\Sigma\Sigma_{ij} M_{i,j}\right)}{\sqrt{\left[N\Sigma\Sigma_{ij} I_{i,j}^2 - \left(\Sigma\Sigma_{ij} I_{i,j}\right)^2\right]\left[N\Sigma\Sigma_{ij} M_{i,j}^2 - \left(\Sigma\Sigma_{ij} M_{i,j}\right)^2\right]}}$$

Those skilled in the art will appreciate that a system according to the invention can determine correlations without having to perform the "expensive" calculation of determining the sum of the products of corresponding image and model pixels, to wit, $\Sigma\Sigma I_{ij} \times M_{ij}$.

Rather, a system according to the invention determines correlations based inter alia on sums of squares. This is particularly advantageous for processing image pixel values and model pixel values that occupy one byte each, or less. For such values, a system according to the invention can store an entire table of the necessary algebraic squares in 2k bytes or less, well less than the size of the cache memory of a conventional commercial microprocessor. By accessing such a table, e.g., rather than calculating each square on an ad hoc basis, processing time is greatly improved.

BRIEF DESCRIPTION OF DRAWINGS

Other objects, features and advantages of the invention will be set forth in, or be apparent from, the following description of a preferring embodiment of the invention, including the drawings thereof, in which.

DETAILED DESCRIPTION OF THE ILLUSTRATIVE EMBODIMENT

Figure 1:
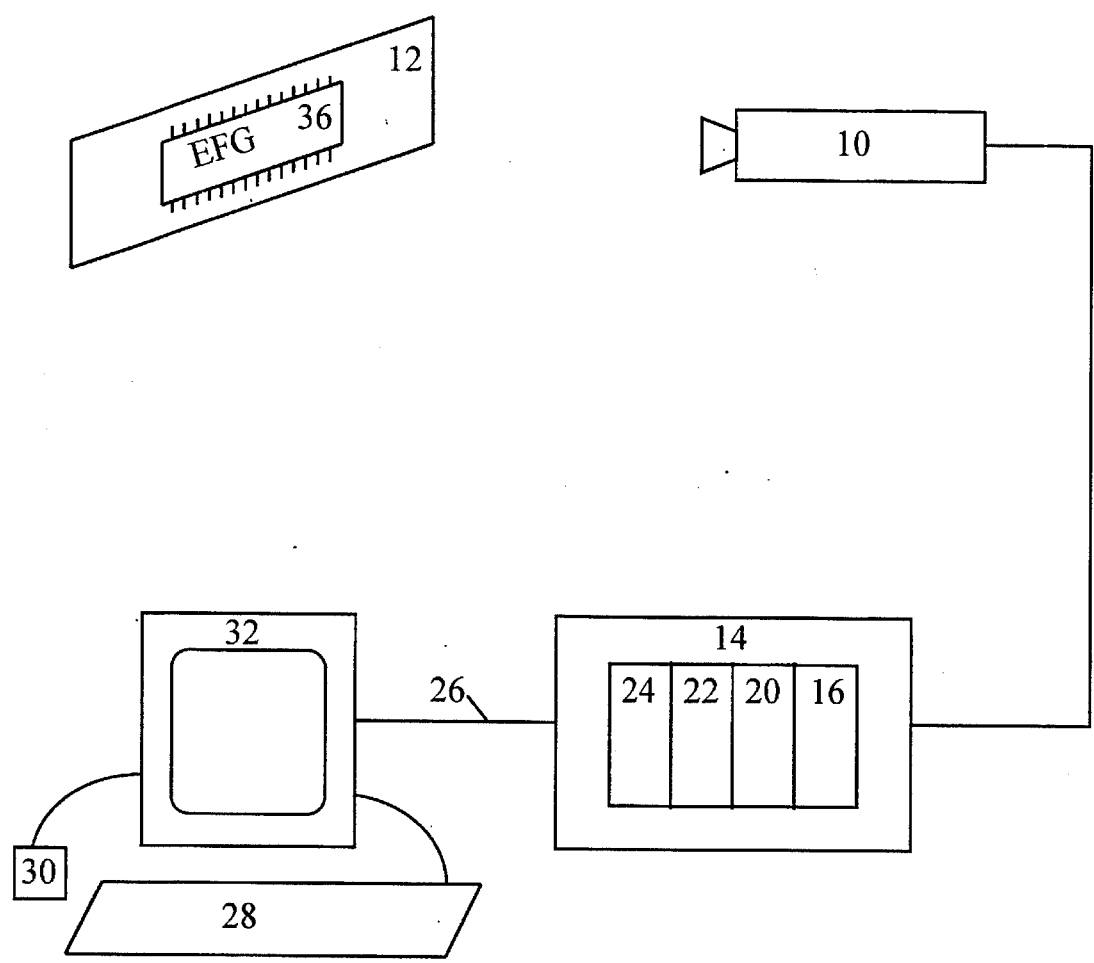
FIG. 1 is a diagrammatic representation of a machine vision system in which the system of the invention is used.

Referring to FIG. 1, a machine vision system is shown that includes a video camera 10 for acquiring an image of an object 12 being inspected. The output of the video camera is routed, through an analog/digital converter that converts the image into a stream of digital values for the pixels making up the image, to a vision processing system 14. The vision processing system includes a central processing unit (CPU) 16, a random access memory 22, an input/output subsystem 24, and a non-volatile memory (e.g., a disk drive) 20. Input/output lines 26 connect the vision processing system 14 to peripheral devices such as a host computer 28, a trackball 30, and a monitor 32.

The input/output subsystem 24 accepts input from the video camera 10, and includes serial lines for the trackball 30 and the host computer 28. The subsystem 24 drives, as output, images for display on the monitor 32, and serial data for the host computer 28. These input/output functions are preferably provided in a manner conventional in the art.

The camera 10 and its associated analog/digital converter acquire an image of the object 12 and generate from it a digital signal consisting of a stream of pixels. This is output to the vision processing system 14, which assembles the stream into an array of pixels for further processing by the system.

Illustrated vision processing system 14 includes a correlation subsystem for comparing the image (or selected portion thereof) to a model to generate a correlation, or shape, score reflecting how closely they match. For a normalized correlation, the score is expressed on a scale between 0 and 1. Many machine vision applications can use this shape score alone as a pass/fail criterion. In other applications, the shape score provides a measure of confidence in whether the system has located an object of real interest.

Figure 2:
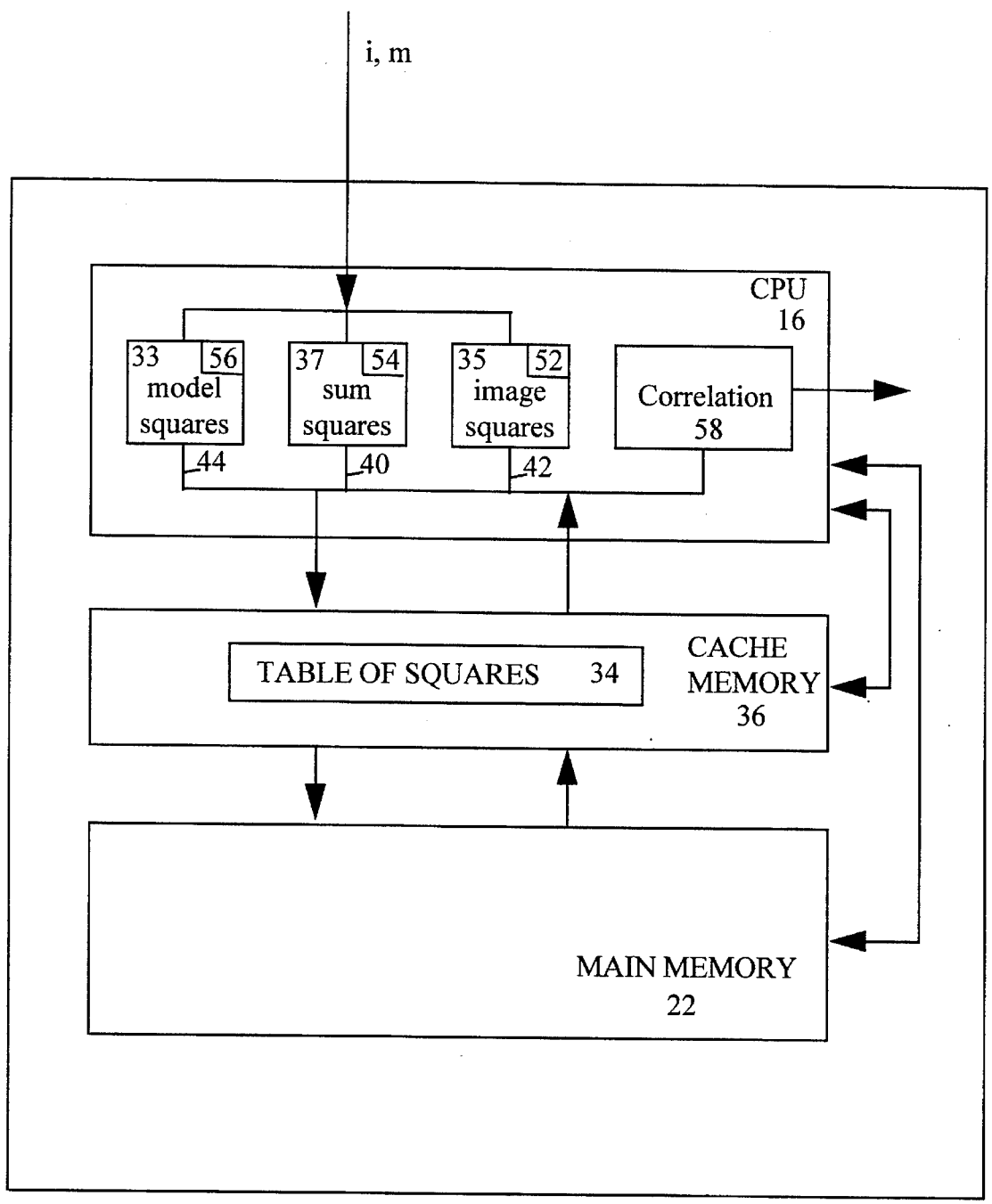
FIG. 2 is a block diagram of the elements of the invention.

The correlation subsystem shown in FIG. 2 correlates the image of interest to a model. Typically, the model is supplied to the subsystem from the vision system's memory 22, while the image is supplied from the image acquisition subsystem (e.g., from camera 10). If not acquired "live" with the image, the model can be created as a portion of a particular image previously captured by the system or it can represent the "average" of several prior images. Alternatively, the model can be defined mathematically as simple edges, corners, and holes. Still alternatively, it can be a "live" pixel stream routed directly from the image acquisition subsystem.

Those skilled in the art of machine vision are familiar with the various procedures for supplying model pixels and image pixels to a vision system component, such as the correlation subsystem, and further detail is not necessary in this application.

The image, and the model, are represented, in the illustrative embodiment, by pixel streams in which each pixel's value is stored as a byte-length word. In other words, 256 gray-level values are possible for each pixel, allowing gray-scale image processing for more accurate and consistent results than those of binary processing.

As noted above, according to the prior art, correlation of two images (e.g., the image and model) requires inter alia the computation of the sums of the products of corresponding pixel values of the image and the model, i.e., $$\Sigma\Sigma Iij \times Mij \qquad \text{Equation (a)}$$

and the sums of the image pixel values squared, i.e., $$\Sigma\Sigma I^2ij \qquad \text{Equation (b)}$$

More fully, by way of example, one prior art technique teaches that such a correlation can be determined in accord with the expression:

$$\frac{N\Sigma\Sigma_{ij} I_{i,j}M_{i,j} - \left(\Sigma\Sigma_{ij} I_{i,j}\right)\left(\Sigma\Sigma_{ij} M_{i,j}\right)}{\sqrt{\left[N\Sigma\Sigma_{ij} I_{i,j}^2 - \left(\Sigma\Sigma_{ij} I_{i,j}\right)^2\right]\left[N\Sigma\Sigma_{ij} M_{i,j}^2 - \left(\Sigma\Sigma_{ij} M_{i,j}\right)^2\right]}} \qquad \text{Equation (c)}$$

where,

N is the total number of pixels, $I_{ij}$ is the image pixel at location (i,j)

$M_{ij}$ is the model pixel at location (i,j)

The inventor hereof has realized that, from polynomial expansion, $$(Iij+Mij)^2 = M^2ij + I^2ij + 2 \times Mij \times Iij \qquad \text{Equation (d)}$$

And, that summing this over the area and rearranging the terms:

$$\Sigma\Sigma I_{ij} \times M_{ij} = \frac{\Sigma\Sigma(I_{ij}+M_{ij})^2 - \Sigma\Sigma I_{ij}^2 - \Sigma\Sigma M_{ij}^2}{2} \qquad \text{Equation (e)}$$

Thus, the sum of the product of corresponding pixels of the model and image, $\Sigma\Sigma Iij \times Mij$, may be derived from the sum of squares of the sums of corresponding image and model pixel values $(\Sigma\Sigma(Iij+Mij)^2)$, the sum of the image pixel values squared $(\Sigma\Sigma Iij^2)$ and the sum of the model pixel values squared $(\Sigma\Sigma Mij^2)$.

Therefore, a system according to the invention can determine correlations based inter alia on sums of squares, i.e., $(\Sigma\Sigma(Iij+Mij)^2)$, $(\Sigma\Sigma Iij^2)$ and $(\Sigma\Sigma Mij^2)$, rather on computation of the sum of the product of corresponding pixels of the model and image, $\Sigma\Sigma Iij \times Mij$. The squares upon which those sums are based, in turn, can be determined without computation but, rather, by reference to a table of algebraic squares.

Referring back to FIG. 2, the correlation subsystem includes an array of squares 34. Preferably, that array contains all possible values of $(I_{ij}+M_{ij})^2$, as well as all possible values of $I_{ij}^2$ (and, in those embodiments where it is not precomputed, all possible values of $M_{ij}^2$).

For example, where $I_{ij}$ and $M_{ij}$ are each one-byte long, the array 34 contains the square of all integers between 0 and 510. Thus, array element (0) contains the value 0; array element (1) contains the value 1; array element (2) contains the value 4, array element (3) contains the value 9; and so forth, with array element (510) containing the value 260, 100. For such byte-sized model and image pixels, array 34 will readily fit in 2k bytes of cache memory. This, of course, is well less than the size of a cache in a conventional commercially-available microprocessor, e.g., an Intel 80486.

The array 34 is preferably loaded completely (or substantially so) into cache memory at the outset of correlation determination. This is accomplished via initial accesses to the array 34 by CPU 16. Each access to the array 34, indexed by the value for which a square is sought, will result in retrieval of the corresponding algebraic square from memory.

In effect, the vision processing system 14 provides in the cache memory 36 of the CPU 16, by way of array of squares 34, rapid addressable access to the algebraic squares of corresponding image and model pixel values, $(I_{ij}+M_{ij})$, of image pixel values $I_{ij}$ and of model pixel values, $M_{ij}$. However, in a preferred embodiment of the invention, sum of the squares of the model pixel values $(\Sigma\Sigma Mij^2)$, as well as the sum of the model pixel values, $(\Sigma\Sigma Mij)$ and the square thereof, $(\Sigma\Sigma Mij)^2$ are stored in memory 22 prior to correlation determination (e.g., during prior operation of the vision system they are pre-calculated and stored in memory 22).

With continued reference to FIG. 2, in one embodiment CPU 16 is configured to provide a model square element 33 for applying model pixel values as address of the array 34 to generate squares of those values. A model accumulator 56 accumulates the sum of the squares of the model pixel values and generating the $\Sigma\Sigma M^2$ signal. As noted above, however, the $\Sigma\Sigma M^2$ signal is that is preferably precalculated and stored in the memory 22 of the system 14.

The CPU 16 is also configured to provide image square element 35 for applying image pixel values as addresses of array 34 to generate squares of those values, $Iij^2$. An image accumulator 52 accumulates the sum of the squares of the image pixel values and to provide the $\Sigma\Sigma Iij^2$ signal.

CPU 16 is also configured to provide a sum square element 37 for applying sums of corresponding image pixel values and model pixel values to the array 34 to generate squares of those sums, $(I+M)^2$. The sum square element 37 includes a sums accumulator 54 for accumulating the sum of the squares of the sums of corresponding image and pixel values and generating the $\Sigma\Sigma(Iij+Mij)^2$ signal.

Still further, the CPU can be configured to provide model square element 33 for applying image pixel values as addresses of array 34 to generate squares of those values, $Mij^2$. An image accumulator 56 accumulates the sum of the squares of the image pixel values and to provide the $\Sigma\Sigma Mij^2$ signal. However, as noted above, this value is preferably computed prior to correlation determination.

The correlator 58, in response to those representative signals, generates a score signal as a function of $\Sigma\Sigma(Iij+Mij)^2$, $\Sigma\Sigma Iij^2$, and $\Sigma\Sigma Mij^2$ signals. More particularly, the correlator 58 generates the score signal in accord with the expression $$\frac{N\frac{\Sigma\Sigma(I_{ij}+M_{ij})^2 - \Sigma\Sigma M_{ij}^2}{2} - \left(\sum_{ij}\Sigma\Sigma I_{i,j}\right)\left(\sum_{ij}\Sigma\Sigma M_{i,j}\right)}{\sqrt{\left[N\Sigma\Sigma I_{ij}^2 - \left(\sum_{ij}\Sigma\Sigma I_{i,j}\right)^2\right]\left[N\Sigma\Sigma M_{ij}^2 - \left(\sum_{ij}\Sigma\Sigma M_{i,j}\right)^2\right]}} \quad \text{Equation (f)}$$

where,

N is the total number of pixels, $I_{ij}$ is the image pixel at location (i,j)

$M_{ij}$ is the model pixel at location (i,j)

In this regard, those skilled in the art will appreciate that terms in Equation (f) other than $\Sigma\Sigma(Iij+Mij)^2$, $\Sigma\Sigma Iij^2$, and $\Sigma\Sigma Mij^2$ are determined in the conventional manner known in the art.

A further understanding of the invention and of a preferred embodiment thereof may be attained by reference to the software listings provided in the appendix hereof, which are written in the C++ programming language for compilation by WatCom compiler.

Described above are methods and apparatus for correlation determination meeting the objects set forth above. Those skilled in the art will, of course, appreciate that the illustrated embodiment is exemplary only and that systems employing modifications thereto fall within the scope of the invention. Thus, for example, it will be appreciated that specifics of the underlying correlation equation (Equation (a)) are exemplary only, and that the teachings hereof can be applied to systems utilizing other underlying correlations. It will also be appreciated that the teachings hereof can be applied to systems utilizing smaller and larger image and model pixels.

In view of the foregoing, what is claimed is:

1. An image processing system responsive to a model signal comprising model pixel values and an image signal comprising image pixel values for generating a score signal representative of a degree of correlation between said model signal and said image signal, said system including:

A. cache memory means for storing for addressable access algebraic squares corresponding to any of model pixel values, image pixel values and sums of image and model pixel values, said cache memory means being responsive to an address signal based on any such value for accessing and generating a signal representative of a corresponding algebraic square, B. central processing unit (CPU) means, coupled to said cache memory means, for processing said model signal and said image signal to generate said score signal, said CPU means including (i) model square means responsive to said model signal for applying to said cache memory means address signals based on at least selected ones of said model pixel values to generate a $\Sigma\Sigma m^2$ signal comprising sums of the squares of those values, (ii) image square means responsive to said image signal for applying to said cache memory means address signals based on at least selected ones of said image pixel values to generate a $\Sigma\Sigma i^2$ signal comprising sums of the squares of those values, and (iii) sum square means responsive to said model and image signals for applying to said cache memory means address signals based on sums of at least selected corresponding ones of said image pixel values and model pixel values to generate a $\Sigma\Sigma(i+m)^2$ signal comprising sums of the squares of those sums, (iv) correlation means, coupled to said model square means, said image square means and said sum square means, for generating said score signal as a function of values in said $\Sigma\Sigma m^2$ signal, said $\Sigma\Sigma i^2$ signal, and said $\Sigma\Sigma(i+m)^2$ signal.

2. An image processing system according to claim 1, wherein

A. said model square means comprises model accumulator means, coupled to said correlation means, for accumulating the squares of at least selected ones of said model pixel values and generating said $\Sigma\Sigma m^2$ signal, B. said image square means comprises image accumulator means, coupled to said correlation means, for accumulating the squares of at least selected ones of said image pixel values and generating said $\Sigma\Sigma i^2$ signal, C. said sum square means comprises sum accumulator means, coupled to said correlation means, for accumulating the squares of at least selected corresponding ones of said image pixel values and model pixel values and generating said $\Sigma\Sigma(i+m)^2$ signal.

3. An image processing system according to claim 2, wherein said correlation means includes means responsive to said $\Sigma\Sigma m^2$ signal, said $\Sigma\Sigma i^2$ signal and said $\Sigma\Sigma(i+m)^2$ signal for generating said score signal as a function of the mathematical expression $$\Sigma\Sigma(Iij+Mij)^2 - \Sigma\Sigma Iij^2 - \Sigma\Sigma Mij^2$$

where $\Sigma\Sigma(Iij+Mij)^2$ represents sums of said squares of at least selected corresponding ones of said image pixel values and model pixel values, $\Sigma\Sigma Iij^2$ represents said squares of at least selected image pixel values, and $\Sigma\Sigma Mij^2$ represents said squares of at least selected model pixel values.

4. An image processing system responsive to a model signal comprising model pixel values and an image signal comprising image pixel values for generating a score signal representative of a degree of correlation between said model signal and said image signal, said system including:

A. cache memory means for storing for addressable access algebraic squares corresponding to any of model pixel values, image pixel values and sums of image and model pixel values, said cache memory means being responsive to an address signal based on any such value for accessing and generating a signal representative of a corresponding algebraic square, B. central processing unit (CPU) means, coupled to said cache memory means, for processing said model signal and said image signal to generate said score signal, said CPU means including (i) image square means responsive to said image signal for applying to said cache memory means address signals based on at least selected ones of said image pixel values to generate a $\Sigma\Sigma i^2$ signal comprising sums of the squares of those values, and (ii) sum square means responsive to said model and image signals for applying to said cache memory means address signals based on sums of at least selected corresponding ones of said image pixel values and model pixel values to generate a $\Sigma\Sigma(i+m)^2$ signal comprising sums of the squares of those sums, (iii) correlation means, coupled to said image square means and said sum square means, for generating said score signal as a function of values in said $\Sigma\Sigma i^2$ signal, and said $\Sigma\Sigma(i+m)^2$ signal.

5. An image processing system according to claim 4, wherein

A. said image square means comprises image accumulator means, coupled to said correlation means, for accumulating the squares of at least selected corresponding ones of said image pixel values and model pixel values and generating said $\Sigma\Sigma i^2$ signal, and B. said sum square means comprises sum accumulator means, coupled to said correlation means, for accumulating the squares of at least selected corresponding ones of said image pixel values and model pixel values and generating said $\Sigma\Sigma(i+m)^2$ signal, and for selectively generating a signal representative thereof.

6. An image processing system according to claim 5, wherein said correlation means includes means responsive to said $\Sigma\Sigma i^2$ signal and said $\Sigma\Sigma(i+m)^2$ signal for generating said score signal as a function of $\Sigma\Sigma(Iij+Mij)^2$ and $\Sigma\Sigma Iij^2$ where $\Sigma\Sigma(Iij+Mij)^2$ represents sums of said squares of at least selected corresponding ones of said image pixel values and model pixel values, and $\Sigma\Sigma Iij^2$ represents said squares of at least selected image pixel values.

7. An image processing system according to claim 4, wherein each of said image pixel values and said model pixel values expressed as byte-size words, and said cache memory means occupies approximately 2K bytes.

8. An image processing system according to any of the prior claims, wherein said CPU means comprises a microprocessor element and wherein said cache memory means comprises an on-chip cache memory unit associated with that microprocessor element.

9. A method for generating a score signal representative of a degree of correlation between a model signal comprising model pixel values and an image signal comprising image pixel values, in an image processing system, said method comprising:

A. storing for addressable access in an on-chip cache memory of a central processing unit (CPU) algebraic squares corresponding to any of model pixel values, image pixel values, and sums of image and model pixel values, B. processing, in said CPU, the model signal and the image signal, to generate a score signal, including:

(i). generating a $\Sigma\Sigma I^2$ signal comprising the squares of the image pixel values, by applying to said cache memory address signals based on said image pixel values, (ii). generating a $\Sigma\Sigma(I+M)^2$ signal comprising the squares of sums of corresponding image and pixel values, by applying to said cache memory address signals based on said sums, (iii). generating, in response to said $\Sigma\Sigma I^2$ signal and said $\Sigma\Sigma(I+M)^2$ signal a score signal, a correlation as a function of the values of said $\Sigma\Sigma I^2$ signal and said $\Sigma\Sigma(I+M)^2$ signal.

10. A method according to claim 9, further including:

A. accumulating the squares of said image pixel values and generating said $\Sigma\Sigma I^2$ signal, and B. accumulating the squares of the sums of said corresponding image and pixel values and generating said $\Sigma\Sigma(I+M)^2$ signal.

11. A method according to claim 10, further including generating, in response to said $\Sigma\Sigma I^2$ signal and said $\Sigma\Sigma(I+M)^2$ signal, a score signal, as a correlation function of the mathematical expression $$\Sigma\Sigma(Iij+Mij)^2 - \Sigma\Sigma Iij^2 - \Sigma\Sigma Mij^2$$

where $\Sigma\Sigma(Iij+Mij)^2$ represents sums of the squares of at least selected corresponding ones of said image pixel values and model pixel values, $\Sigma\Sigma Iij^2$ represents said squares of at least selected image pixel values, and $\Sigma\Sigma Mij^2$ represents squares of at least selected model pixel values.

* * * * *